(12) United States Patent
Inoue

(10) Patent No.: US 12,732,274 B2
(45) Date of Patent: Sep. 8, 2026

(54) OPTICAL TRANSMISSION SYSTEM, OPTICAL DEVICE, AND OPTICAL PROCESSING METHOD

(71) Applicant: NEC Corporation, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 18/578,789

(22) PCT Filed: Jul. 21, 2021

(86) PCT No.: PCT/JP2021/027321
§ 371 (c)(1),
(2) Date: Jan. 12, 2024

(87) PCT Pub. No.: WO2023/002599
PCT Pub. Date: Jan. 26, 2023

(65) Prior Publication Data

US 2024/0333390 A1 Oct. 3, 2024

(51) Int. Cl.
*H04J 14/02* (2006.01)
*H04B 10/25* (2013.01)

(52) U.S. Cl.
CPC ........ *H04B 10/25* (2013.01); *H04J 14/02212* (2023.08)

(58) Field of Classification Search
None
See application file for complete search history.

(56) References Cited

U.S. PATENT DOCUMENTS 7,376,348 B2 * 5/2008 Hasuo ................ H04B 10/2941 398/94
8,064,770 B2 * 11/2011 Manna ................ H04J 14/0305 398/94
8,630,538 B2 * 1/2014 Nashimoto ........ H04B 10/0799 398/31

(Continued)

FOREIGN PATENT DOCUMENTS

JP 2001-144693 A 5/2001
JP 2005-536953 A 12/2005

(Continued)

OTHER PUBLICATIONS

International Search Report for PCT Application No. PCT/JP2021/027321, mailed on Oct. 12, 2021.

(Continued)

*Primary Examiner* — Jai M Lee
(74) *Attorney, Agent, or Firm* — Sughrue Mion, PLLC

(57) ABSTRACT

When a terminal point of an optical signal propagating through a submarine cable is extended in an optical transmission system, development man-hours and costs are increased. Thus, the optical transmission system according to the present invention includes: a first optical device configured to be connected to a plurality of first fibers and a second fiber associated with each of the plurality of first fibers; and a second optical device configured to be connected to the second fiber, the first optical device and the second optical device each include an optical function block, and the optical function block is configured to achieve an optical function defined for each of the plurality of first fibers.

13 Claims, 8 Drawing Sheets

(56) References Cited

U.S. PATENT DOCUMENTS 8,798,473 B2 * 8/2014 Inoue .................. H04J 14/0213 398/94
9,219,565 B2 * 12/2015 Kaneko ................ H04B 10/564
9,755,734 B1 9/2017 Vusirikala et al.
10,505,660 B2 * 12/2019 Yamamoto ........ H04J 14/02212
10,666,354 B2 * 5/2020 Satou ................... H04B 10/079
10,680,738 B2 * 6/2020 Inoue .................. H04J 14/0201
11,165,529 B2 * 11/2021 Yamamoto ......... H04Q 11/0005
11,558,122 B2 * 1/2023 Onuma .................. H04B 10/50
2004/0126119 A1 7/2004 Evangelides et al.
2005/0024715 A1 * 2/2005 Inoue ................ H04J 14/02212 359/337
2008/0304829 A1 * 12/2008 Sato .................. H04J 14/02212 398/79
2012/0243879 A1 9/2012 Nashimoto et al.
2014/0286635 A1 * 9/2014 Kaneko ............. H04J 14/02216 398/34
2015/0093111 A1 * 4/2015 Wang ................ H04J 14/02216 398/48
2017/0126326 A1 5/2017 Aida
2018/0034544 A1 * 2/2018 Satou ............... H04B 10/07955
2018/0069648 A1 * 3/2018 Inada ................... H04B 10/073
2018/0267266 A1 * 9/2018 Yilmaz .............. G02B 6/29322
2019/0052356 A1 * 2/2019 Inoue ................ H04J 14/02216
2019/0296851 A1 * 9/2019 Jiang ................... H04J 14/0261

FOREIGN PATENT DOCUMENTS

JP 2006-148979 A 6/2006
JP 2012-205045 A 10/2012
JP 2019-517169 A 6/2019
WO 2015/145985 A1 10/2015

OTHER PUBLICATIONS

English translation of Written opinion for PCT Application No. PCT/JP2021/027321, mailed on Oct. 12, 2021.

* cited by examiner

OPTICAL TRANSMISSION SYSTEM, OPTICAL DEVICE, AND OPTICAL PROCESSING METHOD

This application is a National Stage Entry of PCT/JP2021/027321 filed on Jul. 21, 2021, the contents of all of which are incorporated herein by reference, in their entirety.

TECHNICAL FIELD

The present invention relates to an optical transmission system, an optical device, and an optical processing method, more particularly to an optical transmission system, an optical device, and an optical processing method that are used together with an optical submarine cable system.

BACKGROUND ART

An optical submarine cable system that connects continents via optical fibers plays a key role as an infrastructure for supporting an international communication network. The optical submarine cable system is constituted of a submarine cable that accommodates an optical fiber, a submarine repeater provided with an optical amplifier, a submarine branching unit that splits an optical signal, a terminal station device installed in a cable landing station, and the like. One example of such an optical submarine cable system is described in PTL 1.

Further, examples of the related art include a technique described in PTL 2.

CITATION LIST

Patent Literature

PTL 1: Published Japanese Translation of PCT International Publication for Patent Application No. 2019-517169

PTL 2: Japanese Unexamined Patent Application Publication No. 2006-148979

SUMMARY OF INVENTION

Technical Problem

In recent years, in a field of the optical submarine cable system, there has been a growing interest in an optical transmission system in which a plurality of fiber pairs accommodated in a submarine cable are allocated to different clients (users). Herein, the fiber pair (FP) includes an optical fiber for an upstream line and an optical fiber for a downstream line.

Meanwhile, there is a growing trend in volume of communication traffic between large-scale data centers located worldwide. As the volume of communication traffic between the data centers is increased, there arises a problem that increasing delays and power consumption are caused by terminating an optical signal (optical path) at a cable landing station (CLS). In order to avoid such a problem, there is a desire to extend a terminal point of an optical signal propagating through a submarine cable, from a cable landing station (CLS) to a point of presence (POP) connected to a client data center or a backbone network that is installed inland.

However, in this case, optical devices owned by clients at data centers or POPs differ for each client, and hence device configurations differ for each client. As a result, a product configuration needs to be changed for each client, specifically, for each fiber pair to be connected, and hence development man-hours and costs are increased.

In this manner, there arises a problem that development man-hours and costs are increased when a terminal point of an optical signal propagating through a submarine cable is extended in an optical transmission system.

An object of the present invention is to provide an optical transmission system, an optical device, and an optical processing method, for solving the above-mentioned problem that development man-hours and costs are increased when a terminal point of an optical signal propagating through a submarine cable is extended in an optical transmission system.

Solution to Problem

An optical transmission system according to the present invention includes a first optical device configured to be connected to a plurality of first fibers and a second fiber associated with each of the plurality of first fibers, and a second optical device configured to be connected to the second fiber, wherein the first optical device and the second optical device each include an optical function block, and the optical function block is configured to achieve an optical function defined for each of the plurality of first fibers.

An optical device according to the present invention includes a first connection means configured to be connected to a plurality of first fibers, a second connection means configured to split connected to a second fiber associated with each of the plurality of first fibers, and an optical function block configured to achieve an optical function defined for each of the plurality of first fibers.

An optical processing method according to the present invention includes subjecting first light to first optical processing, the first light propagating through a plurality of first fibers, and subjecting second light to second optical processing, the second light propagating through a second fiber associated with each of the plurality of first fibers, wherein the first optical processing and the second optical processing are processing of achieving an optical function defined for each of the plurality of first fibers.

Advantageous Effects of Invention

According to the optical transmission system, the optical device, and the optical processing method of the present invention, increase of development man-hours and costs can be avoided in the optical transmission system even when a terminal point of an optical signal propagating through a submarine cable is extended.

EXAMPLE EMBODIMENT

Hereinafter, example embodiments of the present invention are described with reference to the drawings.

First Example Embodiment

Figure 1:
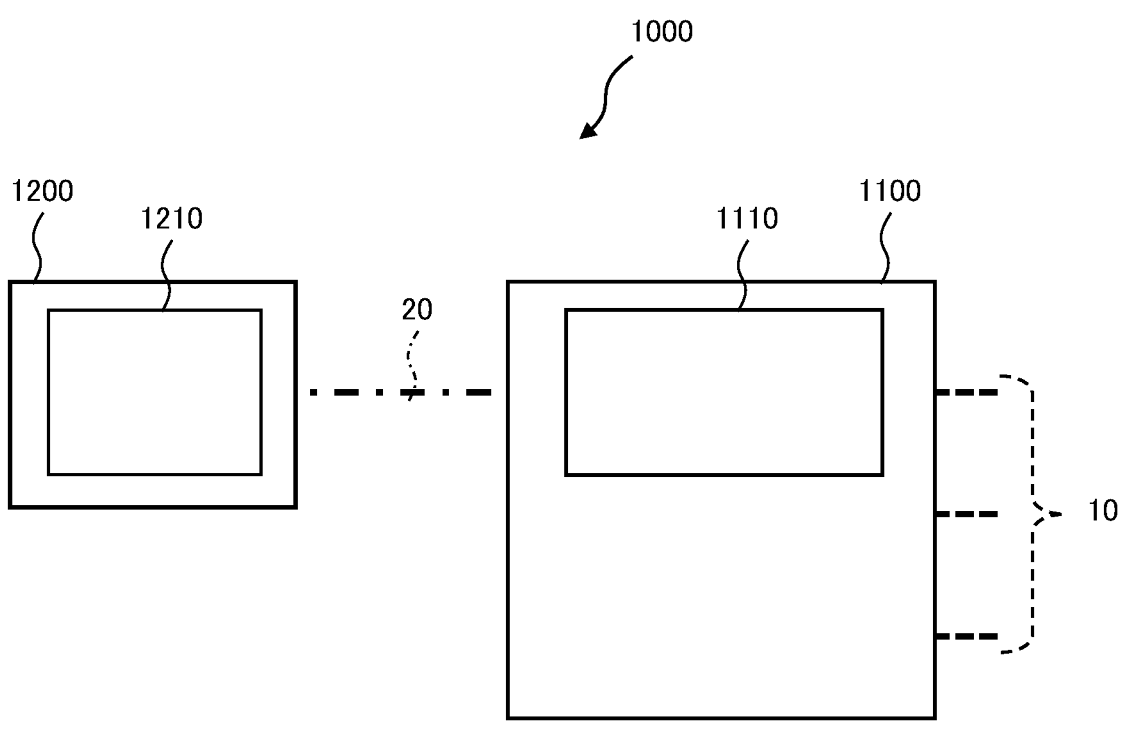
FIG. 1 is a block diagram illustrating a configuration of an optical transmission system according to a first example embodiment of the present invention.

FIG. 1 is a block diagram illustrating a configuration of an optical transmission system 1000 according to a first example embodiment of the present invention. The optical transmission system 1000 includes a first optical device 1100 and a second optical device 1200. The optical transmission system 1000 is suitably used together with an optical submarine cable system.

The first optical device 1100 is configured to be connected to a plurality of first fibers 10 and a second fiber 20 associated with each of the plurality of first fibers 10. The second optical device 1200 is configured to be connected to the second fiber 20. Further, the first optical device 1100 and the second optical device 1200 include optical function blocks 1110 and 1210, respectively, and the optical function blocks 1110 and 1210 are configured to achieve an optical function defined for each of the plurality of first fibers 10.

Herein, the first optical device 1100 may be configured to include a first connection unit (first connection means) configured to be connected to the plurality of first fibers 10 connected to a submarine optical device. Further, the first optical device 1100 may be configured to include a second connection unit (second connection means) configured to be connected to the second fiber 20 laid on land. The first optical device 1100 is typically installed at a cable landing station (CLS) of an optical submarine cable system.

The second optical device 1200 may be configured to include a third connection unit (third connection means) configured to be connected to the second fiber 20 laid on land. Further, the second optical device 1200 may be configured to include a fourth connection unit (fourth connection means) configured to be connected to a third fiber connected to an optical transponder. The second optical device 1200 is typically installed at a point of presence (POP) that is connected to a data center or a backbone network. In this case, a terminal point of an optical signal propagating through a submarine cable can be extended to a data center or a POP. FIG. 1 illustrates a configuration in which the optical transmission system 1000 includes one second optical device 1200, and there may alternatively be adopted a configuration in which a plurality of second optical devices 1200 are included.

The first fiber 10 and the second fiber 20 typically form a fiber pair (FP) including an optical fiber for an upstream line and an optical fiber for a downstream line.

Figure 2:
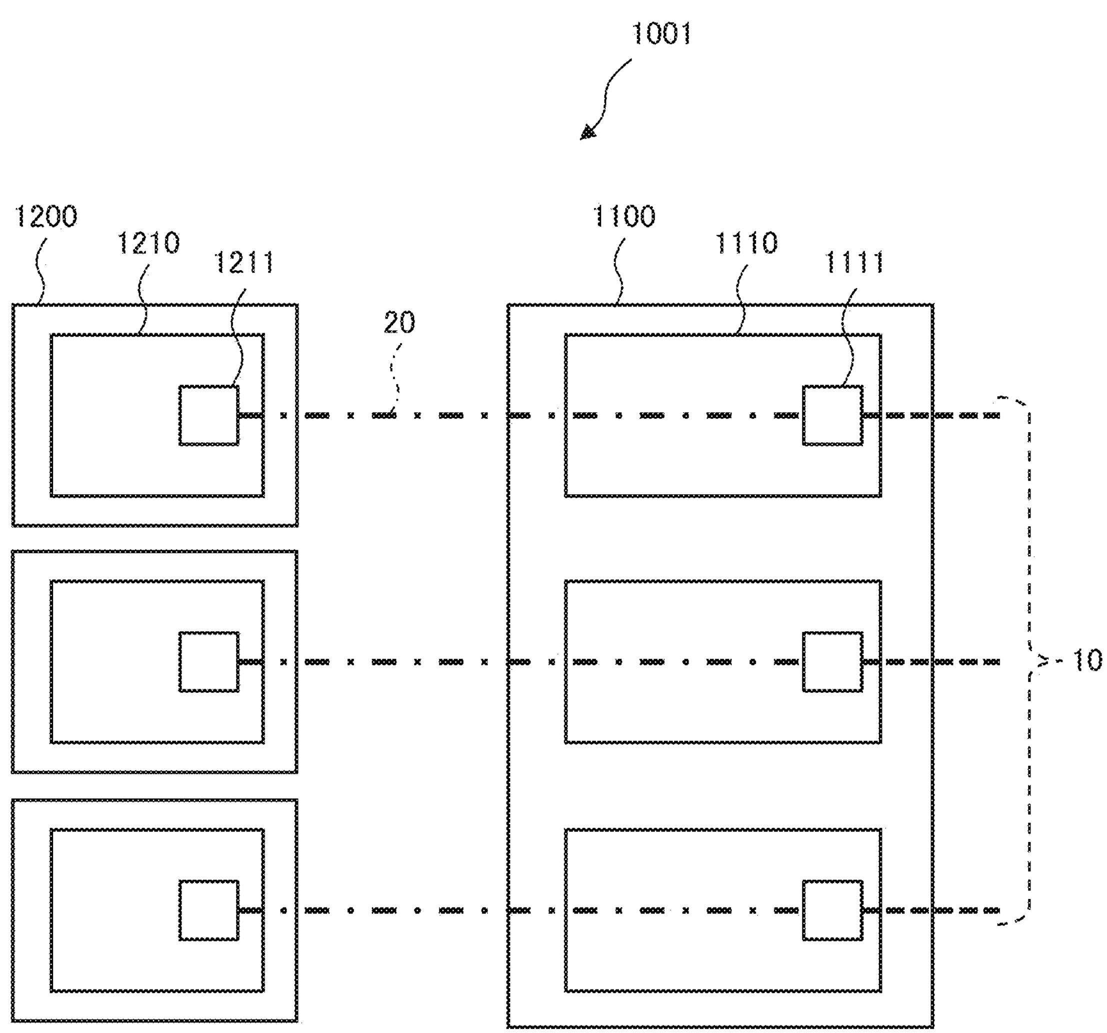
FIG. 2 is a block diagram illustrating another configuration of the optical transmission system according to the first example embodiment of the present invention.

In this manner, the optical transmission system 1000 according to the present example embodiment is configured in such a way that the optical function blocks 1110 and 1210 included in the first optical device 1100 and the second optical device 1200 achieve an optical function defined for each of the plurality of first fibers 10. With this configuration, the constituent elements of the optical function block can be shared commonly, and an optical function can be achieved by a combination of the constituent elements. As a result, there is no need to individually develop a device for achieving an optical function defined for each of the plurality of first fibers. Therefore, according to the optical transmission system 1000 of the present example embodiment, increase of development man-hours and costs can be avoided even when a terminal point of an optical signal propagating through a submarine cable is extended.

the optical transmission system 1000 may be configured in such a way that the optical function blocks 1110 and 1210 each include an optical interface block including an optical interface means. In other words, as in an optical transmission system 1001 illustrated in FIG. 2, there may be adopted a configuration in which the first optical device 1100 includes a first optical interface block 1111 being the optical interface block for each of the plurality of first fibers 10. Further, the second optical device 1200 may be configured to include a second optical interface block 1211 being the optical interface block that is associated with the second fiber 20.

In this manner, there is adopted a configuration in which the first optical device 1100 and the second optical device 1200 include the optical interface blocks 1111 and 1211, respectively, and hence an optical function can be set for each of the plurality of first fibers 10.

As the optical interface means included in the optical interface block, at least one of an optical coupler and an optical switch may be used. Further, the optical interface block may be configured to further include an optical amplifier means and an optical monitor means. Herein, as the optical amplifier means, an erbium-doped fiber amplifier (EDFA) may be used. Further, as the optical monitor means, an optical channel monitor (OCM) may typically be used.

The optical function blocks 1110 and 1210 may each be configured to include a dummy light generation block, a submarine device control block, an optical demultiplexing block, and an optical amplification block. Further, at least one of the first optical device 1100 and the second optical device 1200 may be configured to further include at least one of the dummy light generation block, the submarine device control block, the optical demultiplexing block, and the optical amplification block. With this, the constituent elements (blocks) of the optical function block can be shared commonly, and an optical function defined for each of the plurality of first fibers 10 can be achieved by a combination of the constituent element (blocks).

The dummy light generation block includes a dummy light generation means to generate dummy light. For example, as the dummy light generation means, an amplified spontaneous emission (ASE) light source in which an erbium-doped fiber amplifier (EDFA) is in a no-input signal state may be used.

The submarine device control block includes a control means for a submarine device connected to each of the plurality of first fibers 10. Herein, examples of the submarine device include a submarine branching unit (BU) and a reconfigurable optical add/drop multiplexer (ROADM).

The optical demultiplexing block includes a demultiplexing means for an optical signal. As the demultiplexing means, a wavelength selectable switch (WSS) may typically be used.

The optical amplification block includes an optical amplification means. As the optical amplification means, an erbium-doped fiber amplifier (EDFA) may typically be used.

Herein, each of the blocks including the optical interface block described above may be configured as a flat box-type device. Size reduction of the first optical device 1100 and the second optical device 1200 and reduction of the space can be achieved by providing each flat box-type device to a rack.

Figure 3:
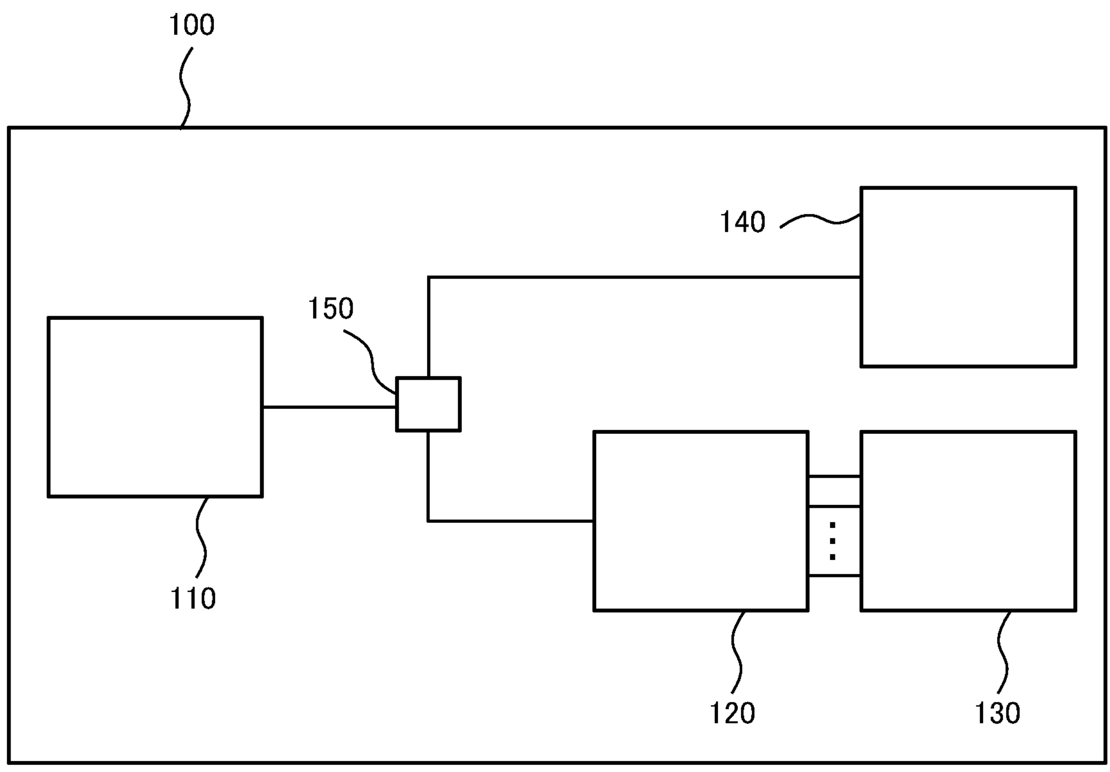
FIG. 3 is a block diagram illustrating a configuration of a dummy light generation block used in the optical transmission system according to the first example embodiment of the present invention.

Next, the dummy light generation block is further described in detail. FIG. 3 illustrates a configuration of a dummy light generation block 100. The dummy light generation block 100 includes a dummy light generation means 110, an optical split means 120, a first output connection means 130, and a second output connection means 140.

Further, a switching means 150 for switching an output destination of the dummy light, which is output from the dummy light generation means 110, to any one of the optical split means 120 and the second output connection means 140 may be provided. Alternatively, the dummy light generation means 110 and the second output connection means 140 may be connected directly to each other without providing the switching means 150. In this case, the second output connection means 140 and the optical split means 120 are connected to each other via an optical patch cord or the like, and thus switching can be performed in such a way that the first output connection means 130 outputs the dummy light via the optical split means 120. Herein, the optical patch cord is acquired by attaching a connector to an optical fiber cable.

As described above, for example, as the dummy light generation means 110, an amplified spontaneous emission (ASE) light source in which an erbium-doped fiber amplifier (EDFA) is in a no-input signal state may be used.

The optical split means 120 is configured to split the dummy light and output a plurality of parts of split dummy light. As the optical split means 120, a multi-branch optical splitter may typically be used.

The first output connection means 130 is configured to output the plurality of parts of split dummy light. Further, the second output connection means 140 is configured to output the dummy light. As the first output connection means 130 and the second output connection means 140, optical adapters may typically be used.

Figure 4:
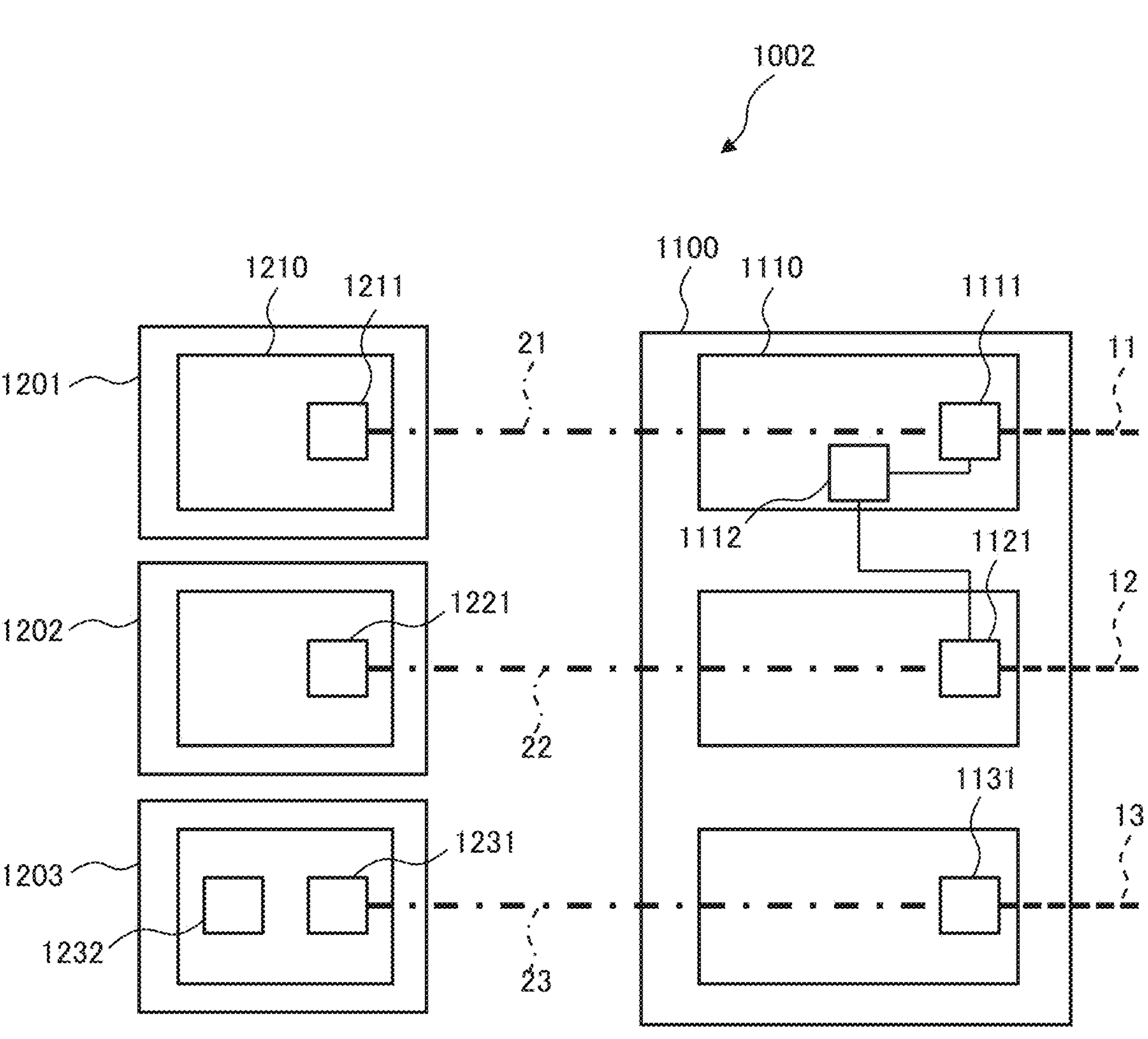
FIG. 4 is a block diagram illustrating further another configuration of the optical transmission system according to the first example embodiment of the present invention.

In this case, as in an optical transmission system 1002 illustrated in FIG. 4, the first optical device 1100 may be configured to include a first dummy light generation block 1112 being the dummy light generation block. The first dummy light generation block 1112 is connected to each of the first optical interface block 1111 and a first optical interface block 1121 via the first output connection means 130 (see FIG. 3).

Herein, the first optical interface block 1111 is connected to a first fiber 11 and a second fiber 21 associated with the first fiber 11. The second fiber 21 is connected to the second optical interface block 1211 included in a second optical device 1201. Similarly, the first optical interface block 1121 is connected to a first fiber 12 and a second fiber 22 associated with the first fiber 12. Further, the second fiber 22 is connected to a second optical interface block 1221 included in a second optical device 1202.

With this configuration, the split dummy light can be supplied simultaneously to the plurality of first fibers 11 and 12. Therefore, even when the plurality of first fibers 11 and 12 are not in use, a state in which an optical pulse can simultaneously be introduced to the plurality of first fibers 11 and 12 can be achieved. Thus, an optical fiber that is not in use (dark fiber) can be monitored without causing generation of an optical surge.

Further, as illustrated in FIG. 4, there may be adopted a configuration in which a second optical device 1203 includes a second dummy light generation block 1232 being the dummy light generation block. The second dummy light generation block 1232 is connected to a second optical interface block 1231 via the second output connection means 140 (see FIG. 3).

Herein, the second optical interface block 1231 is connected to a second fiber 23. The second fiber 23 is connected to a first optical interface block 1131 included in the first optical device 1100. Further, the first optical interface block 1131 is connected to a first fiber 13 associated with the second fiber 23.

With this configuration, wavelength dependency of a loss and a gain at the first fiber 13 or a submarine device connected to the first fiber 13 can be compensated individually by the dummy light. In other words, even when a client allocated to the first fiber 13 does not own an optical device for generating dummy light at a data center or a POP, a function of compensating the above-mentioned wavelength dependency of a submarine device or the like with the dummy light can be provided.

In this manner, according to the optical transmission system of the present example embodiment, the optical function block can be configured in such a way that a client's demand allocated for each of the first fibers is satisfied. In this case, in the optical transmission system 1002 of the present example embodiment, the dummy light generation block being a constituent element of the optical function block is commonly shared, and hence increase of development man-hours and costs can be avoided.

There may be adopted a configuration in which the first optical device 1100 includes the dummy light generation block configured as described above (omitted in illustration). In other words, the first optical device 1100 may be configured to include the first dummy light generation block being the dummy light generation block, and the first dummy light generation block may be configured to be connected to the first optical interface block 1131 via a second output connection means (see FIG. 3). Herein, the first optical interface block 1131 is connected to the first fiber 13.

With this configuration, wavelength dependency of a loss and a gain at the first fiber 13 or a submarine device connected to the first fiber 13 can also be compensated individually by the dummy light.

Figure 5:
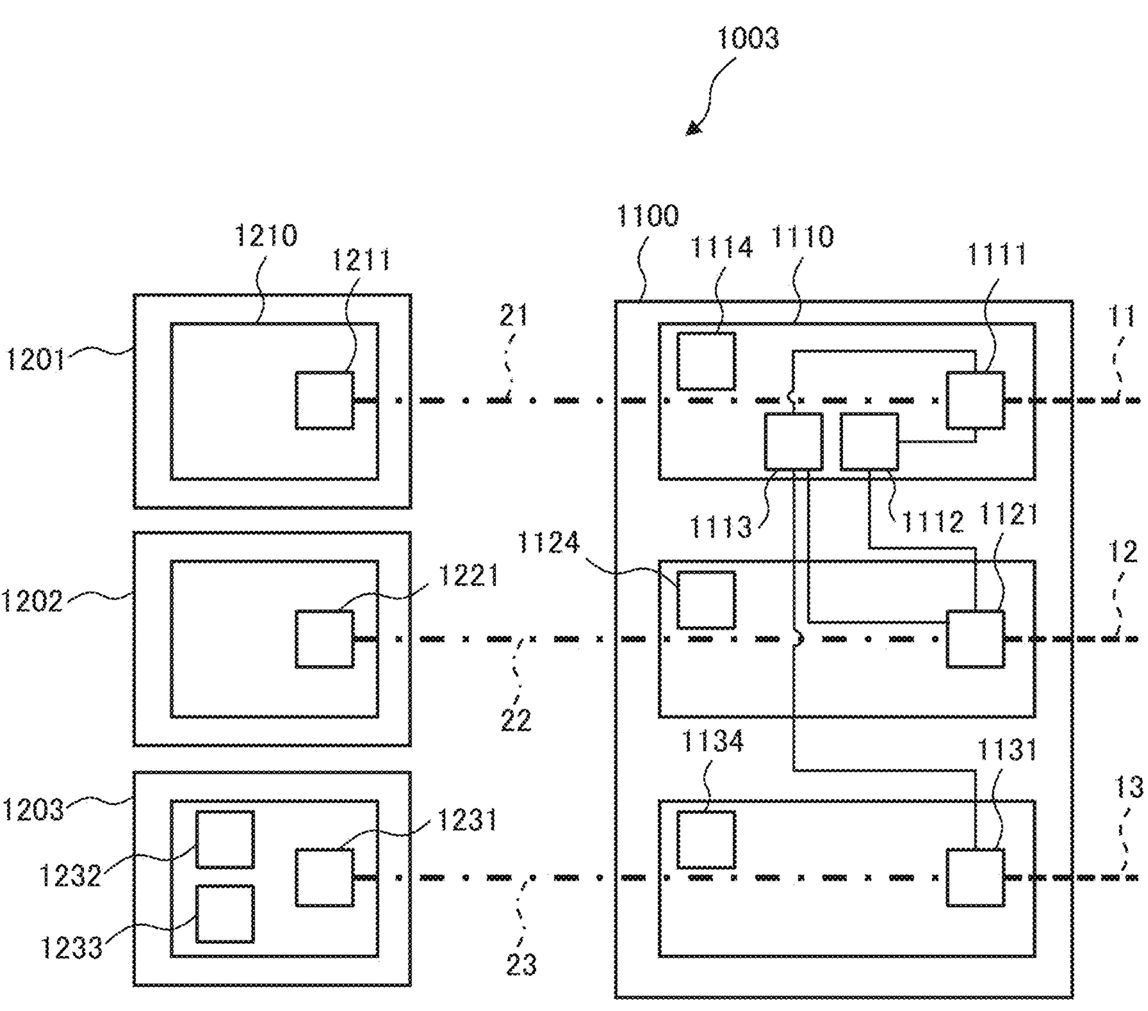
FIG. 5 is a block diagram illustrating further another configuration of the optical transmission system according to the first example embodiment of the present invention.

FIG. 5 illustrates one example the optical transmission system in which the first optical device and the second optical device include other blocks.

As illustrated in FIG. 5, in an optical transmission system 1003, the first optical device 1100 may be configured to further include a submarine device control block 1113. The submarine device control block 1113 is connected to each of the first optical interface blocks 1111, 1121, and 1131. With this, a submarine device connected to the plurality of first fibers 11, 12, and 13 can be controlled via the first optical interface blocks 1111, 1121, and 1131.

Further, the first optical device 1100 may be configured to include optical amplification blocks 1114, 1124, and 1134 for the plurality of first fibers 11, 12, and 13, respectively. With this, the second fibers 21, 22, and 23 can be extended by, for example, approximately 100 kilometers (km). When the first optical device 1100 and the second optical device 1200 are close to each other, and the second fibers 21, 22, and 23 are short, an optical amplifier means included in each of the first optical interface blocks 1111, 1121, and 1131 may be used in place of the optical amplification blocks 1114, 1124, and 1134.

Further, in the optical transmission system 1003, the second optical device 1203 may be configured to include an optical demultiplexing block 1233. With this, even when a client allocated to the first fiber 13 does not own an optical device for optical demultiplexing, wavelength multiplexing transmission can be performed by connecting an optical transponder to the optical demultiplexing block 1233.

Next, an optical processing method according to the present example embodiment is described.

In the optical processing method according to the present example embodiment, first light propagating through the plurality of first fibers is subjected to first optical processing. Further, second light propagating through the second fiber associated with each of the plurality of first fibers is subjected to second optical processing. Herein, the first optical processing and the second optical processing are processing for achieving an optical function defined for each of the plurality of first fibers.

The first optical processing and the second optical processing may be configured to achieve an optical function by combining any one of processing of introducing dummy light being at least one of the first light and the second light, processing of controlling a submarine device connected to the plurality of first fibers, processing of demultiplexing at least one of the first light and the second light, and processing of amplifying at least one of the first light and the second light.

In this case, the first optical processing may be configured to include processing of introducing the dummy light being the first light. Herein, the processing of introducing the dummy light may include processing of generating the dummy light, processing of splitting the dummy light and generating the plurality of parts of split dummy light, and processing of introducing the plurality of parts of split dummy light to each of the plurality of first fibers.

Further, the first optical processing may be configured to include processing of introducing the dummy light being the first light, and the processing of introducing the dummy light may be configured to include processing of generating the dummy light and processing of introducing the dummy light to any one of the plurality of first fibers.

Meanwhile, the second optical processing maybe configured to include processing of introducing the dummy light being the second light. Herein, the processing of introducing the dummy light may include processing of generating the dummy light and processing of introducing the dummy light to the second fiber.

The first optical processing can be processing relating to the first light propagating through the plurality of first fibers connected to a submarine optical device. Further, the second optical processing can be processing relating to the second light propagating through the second fiber laid on land.

As described above, according to the optical transmission systems 1000 to 1003 and the optical processing method of the present example embodiment, increase of development man-hours and costs can be avoided in the optical transmission system even when a terminal point of an optical signal propagating through a submarine cable is extended.

Second Example Embodiment

Figure 6:
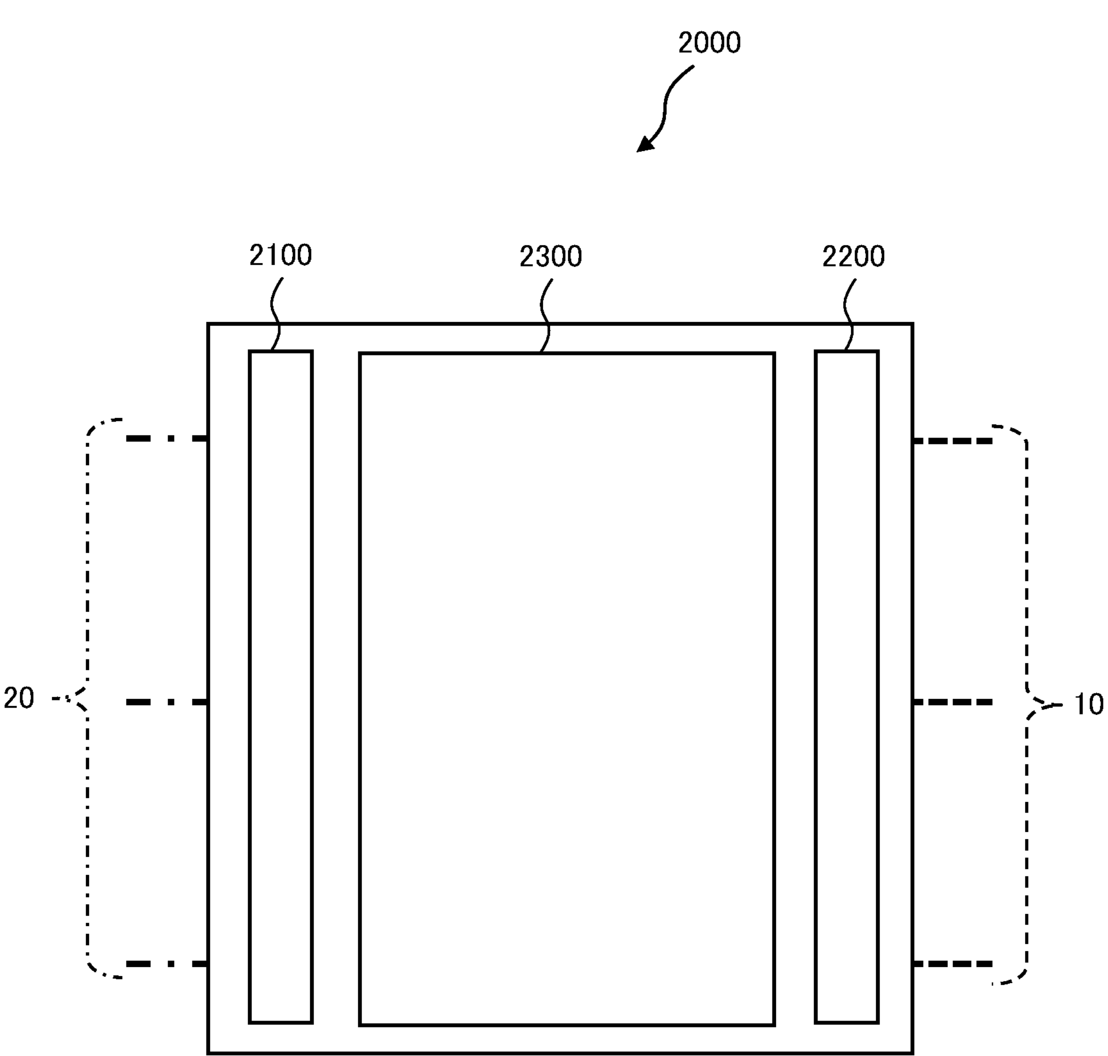
FIG. 6 is a block diagram illustrating a configuration of an optical device according to a second example embodiment of the present invention.

Next, a second example embodiment of the present invention is described. FIG. 6 illustrates a configuration of an optical device 2000 according to the present example embodiment. The optical device 2000 includes a first connection unit (first connection means) 2100, a second connection unit (second connection means) 2200, and an optical function block 2300. The optical device 2000 is suitably used together with an optical submarine cable system.

The first connection unit 2100 is configured to be connected to the plurality of first fibers 10. The second connection unit 2200 is configured to be connected to the second fiber 20 associated with each of the plurality of first fibers 10. Further, the optical function block 2300 is configured to achieve an optical function defined for each of the plurality of first fibers 10. The optical device 2000 is typically installed at a cable landing station (CLS) of an optical submarine cable system.

Herein, the first connection unit 2100 may be configured to be connected to the plurality of first fibers 10 connected to a submarine optical device. Further, the second connection unit 2200 may be configured to be connected to the second fiber 20 laid on land.

The first fiber 10 and the second fiber 20 typically form a fiber pair (FP) including an optical fiber for an upstream line and an optical fiber for a downstream line.

In this manner, the optical device 2000 according to the present example embodiment includes the optical function block 2300, and the optical function block 2300 is configured to achieve an optical function defined for each of the plurality of first fibers 10. With this configuration, the constituent elements of the optical function block can be shared commonly, and an optical function can be achieved by a combination of the constituent elements. As a result, there is no need to individually develop a device for achieving an optical function defined for each of the plurality of first fibers. Therefore, according to the optical device 2000 of the present example embodiment, increase of development man-hours and costs can be avoided even when a terminal point of an optical signal propagating through a submarine cable is extended.

Figure 7:
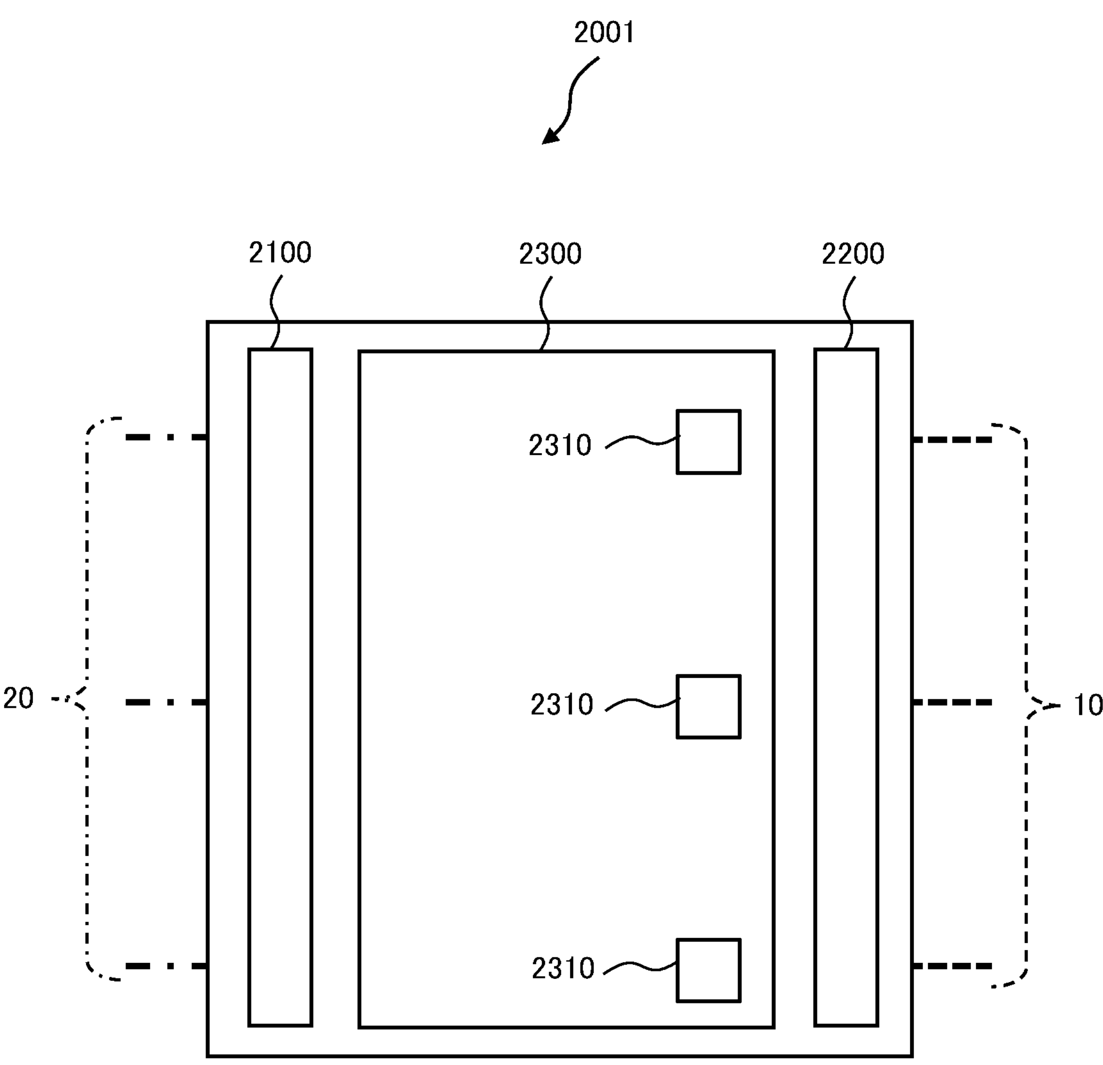
FIG. 7 is a block diagram illustrating another configuration of the optical device according to the second example embodiment of the present invention.

Further, as in an optical device 2001 illustrated in FIG. 7, there may be adopted a configuration in which the optical function block 2300 includes an optical interface block 2310 including an optical interface means for each of the plurality of first fibers 10. As the optical interface means included in the optical interface block 2310, at least one of an optical coupler and an optical switch may be used.

The optical interface block 2310 may be configured to further include an optical amplifier means and an optical monitor means. Herein, as the optical amplifier means, an erbium-doped fiber amplifier (EDFA) may be used. Further, as the optical monitor means, an optical channel monitor (OCM) may typically be used.

The optical function block 2300 may be configured to further include at least one of the dummy light generation block, the submarine device control block, the optical demultiplexing block, and the optical amplification block. With this, the constituent elements (blocks) of the optical function block can be shared commonly, and an optical function defined for each of the plurality of first fibers 10 can be achieved by a combination of the constituent element (blocks)

Figure 8:
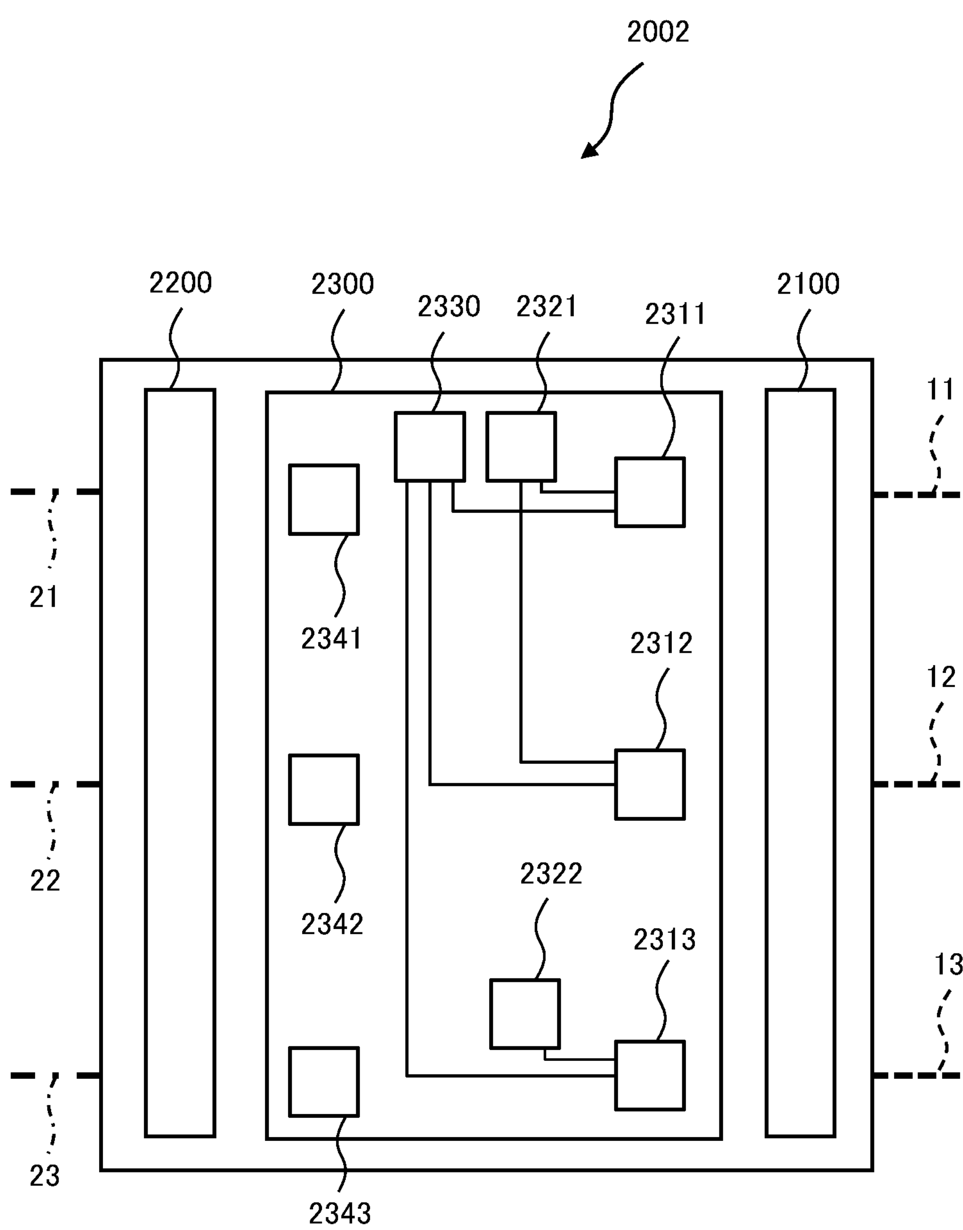
FIG. 8 is a block diagram illustrating further another configuration of the optical device according to the second example embodiment of the present invention.

As one example, FIG. 8 illustrates a configuration of an optical device 2002 in which the optical function block 2300 includes optical interface blocks 2311, 2312, and 2313, dummy light generation blocks 2321 and 2322, a submarine device control block 2330, and optical amplification blocks 2341, 2342, and 2343. Herein, the optical interface blocks 2311, 2312, and 2313 are connected to the plurality of first fibers 11, 12, and 13, respectively, via the first connection unit 2100. Similarly, the optical interface blocks 2311, 2312, and 2313 are connected to the second fibers 21, 22, and 23, respectively, via the second connection unit 2200.

Each of the dummy light generation blocks 2321 and 2322 includes a dummy light generation means that generates dummy light. For example, as the dummy light generation means, an amplified spontaneous emission (ASE) light source in which an erbium-doped fiber amplifier (EDFA) is in a no-input signal state may be used.

The submarine device control block 2330 includes a control means for a submarine device connected to each of the plurality of first fibers 11, 12, and 13. Herein, examples of the submarine device include a branching unit (BU) and a reconfigurable optical add/drop multiplexer (ROADM).

The optical amplification blocks 2341, 2342, and 2343 each include an optical amplification means. As the optical amplification means, an erbium-doped fiber amplifier (EDFA) may typically be used. With this configuration including the optical amplification blocks 2341, 2342, and 2343, the second fibers 21, 22, and 23 can be extended by, for example, approximately 100 kilometers (km). In other words, a terminal point of an optical signal propagating through a submarine cable including the first fibers 11, 12, and 13 can be extended. When the second fibers 21, 22, and 23 are short, an optical amplifier means included in each of the optical interface blocks 2311, 2312, and 2313 may be used in place of the optical amplification blocks 2341, 2342, and 2343.

The optical demultiplexing block includes a demultiplexing means for an optical signal. As the demultiplexing means, a wavelength selectable switch (WSS) may typically be used.

Herein, each of the blocks described above may be configured as a flat box-type device. Size reduction of the optical devices 2000, 2001, and 2002 and reduction of the space can be achieved by providing each flat box-type device to a rack. Further, in the optical devices 2000, 2001, and 2002 of the present example embodiment, each of blocks being the constituent elements of the optical function block is commonly shared, and hence increase of development man-hours and costs can be avoided.

The configurations of the dummy light generation blocks 2321 and 2322 are similar to the configuration of the dummy light generation block 100 according to the first example embodiment illustrated in FIG. 3. In other words, the dummy light generation blocks 2321 and 2322 each includes the dummy light generation means, the optical split means, the first output connection means, and the second output connection means.

As described above, for example, as the dummy light generation means, an amplified spontaneous emission (ASE) light source in which an erbium-doped fiber amplifier (EDFA) is in a no-input signal state may be used.

The optical split means is configured to split the dummy light and output the plurality of parts of split dummy light. As an optical split unit, a multi-branch optical splitter may typically be used.

The first output connection means is configured to output the plurality of parts of split dummy light. Further, the second output connection means is configured to output the dummy light. As the first output connection means and the second output connection means, optical adapters may typically be used.

In this state, the dummy light generation block 2321 included in the optical function block 2300 can be configured to be connected to each of the optical interface blocks 2311 and 2312 via the first output connection means. With this configuration, the split dummy light can be supplied simultaneously to the plurality of first fibers 11 and 12. Therefore, even when the plurality of first fibers 11 and 12 are not in use, a state in which an optical pulse can simultaneously be introduced to the plurality of first fibers 11 and 12 can be achieved. Thus, an optical fiber that is not in use (dark fiber) can be monitored without causing generation of an optical surge.

Further, the dummy light generation block 2322 included in the optical function block 2300 may be configured to be connected to the optical interface block 2313 via the second output connection means. With this configuration, wavelength dependency of a loss and a gain at the first fiber 13 pr a submarine device connected to the first fiber 13 can be compensated individually by the dummy light.

In this manner, according to the optical devices 2000, 2001, and 2002 of the present example embodiment, the optical function block can be configured in such a way that a client's demand allocated for each of the first fibers 11, 12, and 13 is satisfied.

As described above, according to the optical devices 2000, 2001, and 2002 of the present example embodiment, increase of development man-hours and costs can be avoided even when a terminal point of an optical signal propagating through a submarine cable is extended.

The whole or a part of the example embodiments described above can be described as, but not limited to, the following supplementary notes.

(Supplementary note 1) An optical transmission system comprising: a first optical device configured to be connected to a plurality of first fibers and a second fiber associated with each of the plurality of first fibers; and a second optical device configured to be connected to the second fiber, wherein the first optical device and the second optical device each include an optical function block, and the optical function block is configured to achieve an optical function defined for each of the plurality of first fibers.

(Supplementary note 2) The optical transmission system according to Supplementary note 1, wherein the optical function block includes an optical interface block including an optical interface means, the first optical device includes a first optical interface block being the optical interface block for each of the plurality of first fibers, and the second optical device includes a second optical interface block being the optical interface block that is associated with the second fiber.

(Supplementary note 3) The optical transmission system according to Supplementary note 2, wherein the optical function block includes: a dummy light generation block including a dummy light generation means to generate dummy light; a submarine device control block including a control means for a submarine device connected to the plurality of first fibers; an optical demultiplexing block including a demultiplexing means for an optical signal; and an optical amplification block including an optical amplification means, and at least one of the first optical device and the second optical device further includes at least one of the dummy light generation block, the submarine device control block, the optical demultiplexing block, and the optical amplification block.

(Supplementary note 4) The optical transmission system according to Supplementary note 3, wherein the dummy light generation block includes: the dummy light generation means; an optical split means configured to split the dummy light and output a plurality of parts of split dummy light; a first output connection means configured to output the plurality of parts of split dummy light; and a second output connection means configured to output the dummy light.

(Supplementary note 5) The optical transmission system according to Supplementary note 4, wherein the first optical device includes a first dummy light generation block being the dummy light generation block, and the first dummy light generation block is connected to each of the first optical interface blocks via the first output connection means.

(Supplementary note 6) The optical transmission system according to Supplementary note 4, wherein the first optical device includes a first dummy light generation block being the dummy light generation block, and the first dummy light generation block is connected to the first optical interface block via the second output connection means.

(Supplementary note 7) The optical transmission system according to Supplementary note 4 or 5, wherein the second optical device includes a second dummy light generation block being the dummy light generation block, and the second dummy light generation block is connected to the second optical interface block via the second output connection means.

(Supplementary note 8) The optical transmission system according to any one of Supplementary notes 2 to 7, wherein the optical interface block further includes an optical amplifier means and an optical monitor means.

(Supplementary note 9) The optical transmission system according to any one of Supplementary notes 1 to 8, wherein the first optical device includes: a first connection means configured to be connected to the plurality of first fibers to be connected to a submarine optical device; and a second connection means configured to be connected to the second fiber laid on land.

(Supplementary note 10) The optical transmission system according to any one of Supplementary notes 1 to 9, wherein the second optical device includes: a third connection means configured to be connected to the second fiber laid on land; and a fourth connection means configured to be connected to a third fiber to be connected to an optical transponder.

(Supplementary note 11) An optical device, comprising: a first connection means configured to be connected to a plurality of first fibers; a second connection means configured to be connected to a second fiber associated with each of the plurality of first fibers; and an optical function block configured to achieve an optical function defined for each of the plurality of first fibers.

(Supplementary note 12) The optical device according to Supplementary note 11, wherein the optical function block includes an optical interface block including an optical interface means for each of the plurality of first fibers.

(Supplementary note 13) The optical device according to Supplementary note 12, wherein the optical function block further includes at least one of: a dummy light generation block including a dummy light generation means to generate dummy light; a submarine device control block including a control means for a submarine device to be connected to the plurality of first fibers; an optical demultiplexing block including a demultiplexing means for an optical signal; and an optical amplification block including an optical amplification means.

(Supplementary note 14) The optical device according to Supplementary note 13, wherein the dummy light generation block includes: the dummy light generation means; an optical split means configured to split the dummy light and output a plurality of parts of split dummy light; a first output connection means configured to output the plurality of parts of split dummy light; and a second output connection means configured to output the dummy light.

(Supplementary note 15) The optical device according to Supplementary note 14, wherein the optical function block includes the dummy light generation block, and the dummy light generation block is connected to each of the optical interface blocks via the first output connection means.

(Supplementary note 16) The optical device according to Supplementary note 14, wherein the optical function block includes the dummy light generation block, and the dummy light generation block is connected to the optical interface block via the second output connection means.

(Supplementary note 17) The optical device according to any one of Supplementary notes 12 to 16, wherein the optical interface block further includes an optical amplifier means and an optical monitor means.

(Supplementary note 18) The optical device according to any one of Supplementary notes 11 to 17, wherein the first connection means is configured to be connected to the plurality of first fibers to be connected to a submarine optical device, and the second connection means is configured to be connected to the second fiber laid on land.

(Supplementary note 19) An optical processing method, comprising: subjecting first light to first optical processing, the first light propagating through a plurality of first fibers; and subjecting second light to second optical processing, the second light propagating through a second fiber associated with each of the plurality of first fibers, wherein the first optical processing and the second optical processing are processing of achieving an optical function defined for each of the plurality of first fibers.

(Supplementary note 20) The optical processing method according to Supplementary note 19, wherein the first optical processing and the second optical processing achieve the optical function by combining any of processing of introducing dummy light as at least one of the first light and the second light, processing of controlling a submarine device to be connected to the plurality of first fibers, processing of demultiplexing at least one of the first light and the second light, and processing of amplifying at least one of the first light and the second light.

(Supplementary note 21) The optical processing method according to Supplementary note 20, wherein the first optical processing includes processing of introducing the dummy light being the first light, and the processing of introducing the dummy light includes processing of generating the dummy light, processing of splitting the dummy light and generating a plurality of parts of split dummy light, and processing of introducing the plurality of parts of split dummy light to each of the plurality of first fibers.

(Supplementary note 22) The optical processing method according to Supplementary note 20, wherein the first optical processing includes processing of introducing the dummy light being the first light, and the processing of introducing the dummy light includes processing of generating the dummy light and processing of introducing the dummy light to any one of the plurality of first fibers.

(Supplementary note 23) The optical processing method according to Supplementary note 20 or 21, wherein the second optical processing includes processing of introducing the dummy light being the second light, and the processing of introducing the dummy light includes processing of generating the dummy light and processing of introducing the dummy light to the second fiber.

(Supplementary note 24) The optical processing method according to any one of Supplementary notes 19 to 23, wherein the first optical processing is processing relating to the first light propagating through the plurality of first fibers to be connected to a submarine optical device, and the second optical processing is processing relating to the second light propagating through the second fiber laid on land.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1000, 1001, 1002, 1003 Optical transmission system
1100 First optical device
1110, 1210, 2300 Optical function block
1111, 1121, 1131 First optical interface block
1112 First dummy light generation block
1113, 2330 Submarine device control block
1114, 1124, 1134, 2341, 2342, 2343 Optical amplification block
1200, 1201, 1202, 1203 Second optical device
1211, 1221, 1231 Second optical interface block
1232 Second dummy light generation block
1233 Optical demultiplexing block
2000, 2001, 2002 Optical device
2100 First connection unit
2200 Second connection unit
2310, 2311, 2312, 2313 Optical interface block
2321, 2322 Dummy light generation block
100 Dummy light generation block
110 Dummy light generation means
120 Optical split means
130 First output connection means
140 Second output connection means
150 Switching means
10, 11, 12, 13 First fiber
20, 21, 22, 23 Second fiber

What is claimed is:

1. An optical transmission system comprising:

a first optical device configured to be connected to a plurality of first fibers and a second fiber associated with each of the plurality of first fibers; and a second optical device configured to be connected to the second fiber, wherein the first optical device and the second optical device each include an optical function block, and the optical function block is configured to achieve an optical function defined for each of the plurality of first fibers, the optical function block in the second optical device achieves the optical function for each of the plurality of first fibers through connection with the second fiber associated with each of the plurality of first fibers, the optical function block includes an optical interface block including an optical interface, the first optical device includes a first optical interface block being the optical interface block for each of the plurality of first fibers, and the second optical device includes a second optical interface block being the optical interface block that is associated with the second fiber, the optical function block includes:

a dummy light generation block including a dummy light generator to generate dummy light;

a submarine device control block including a controller for a submarine device connected to the plurality of first fibers;

an optical demultiplexing block including a demultiplexer for an optical signal; and an optical amplification block including an optical amplifier, and at least one of the first optical device and the second optical device further includes at least one of the dummy light generation block, the submarine device control block, the optical demultiplexing block, and the optical amplification block, and the dummy light generation block includes:

the dummy light generator;

an optical splitter configured to split the dummy light and output a plurality of parts of split dummy light;

a first output connector configured to simultaneously output the plurality of parts of split dummy light; and a second output connector configured to output the dummy light.

2. The optical transmission system according to claim 1, wherein the first optical device includes a first dummy light generation block being the dummy light generation block, and the first dummy light generation block is connected to each of the first optical interface blocks via the first output connector.

3. The optical transmission system according to claim 1, wherein the first optical device includes a first dummy light generation block being the dummy light generation block, and the first dummy light generation block is connected to the first optical interface block via the second output connector.

4. The optical transmission system according to claim 1, wherein the second optical device includes a second dummy light generation block being the dummy light generation block, and the second dummy light generation block is connected to the second optical interface block via the second output connector.

5. The optical transmission system according to claim 1, wherein the optical interface block further includes an optical amplifier and an optical monitor.

6. The optical transmission system according to claim 1, wherein the first optical device includes:

a first connector configured to be connected to the plurality of first fibers to be connected to a submarine optical device; and a second connector configured to be connected to the second fiber laid on land.

7. The optical transmission system according to claim 1, wherein the second optical device includes:

a third connector configured to be connected to the second fiber laid on land; and a fourth connector configured to be connected to a third fiber to be connected to an optical transponder.

8. An optical device comprising:

a first connector configured to be connected to a plurality of first fibers;

a second connector configured to be connected to a second fiber associated with each of the plurality of first fibers; and an optical function block configured to achieve an optical function defined for each of the plurality of first fibers, wherein the optical function block includes an optical interface block including an optical interface for each of the plurality of first fibers, the optical function block further includes at least one of:

a dummy light generation block including a dummy light generator to generate dummy light;

a submarine device control block including a controller for a submarine device to be connected to the plurality of first fibers;

an optical demultiplexing block including a demultiplexer for an optical signal; and an optical amplification block including an optical amplifier, and the dummy light generation block includes:

the dummy light generator;

an optical splitter configured to split the dummy light and output a plurality of parts of split dummy light;

a first output connector configured to simultaneously output the plurality of parts of split dummy light; and a second output connector configured to output the dummy light.

9. The optical device according to claim 8, wherein the optical function block includes the dummy light generation block, and the dummy light generation block is connected to each of the optical interface blocks via the first output connector.

10. The optical device according to claim 8, wherein the optical function block includes the dummy light generation block, and the dummy light generation block is connected to the optical interface block via the second output connector.

11. The optical device according to claim 8, wherein the optical interface block further includes an optical amplifier and an optical monitor.

12. The optical device according to claim 8, wherein the first connector is configured to be connected to the plurality of first fibers to be connected to a submarine optical device, and the second connector is configured to be connected to the second fiber laid on land.

13. An optical processing method comprising:

subjecting first light to first optical processing, the first light propagating through a plurality of first fibers; and subjecting second light to second optical processing, the second light propagating through a second fiber associated with each of the plurality of first fibers, wherein the first optical processing and the second optical processing are processes of achieving an optical function defined for each of the plurality of first fibers, the first optical processing and the second optical processing achieve the optical function by combining any of processing of introducing dummy light as at least one of the first light and the second light, processing of controlling a submarine device to be connected to the plurality of first fibers, processing of demultiplexing at least one of the first light and the second light, and processing of amplifying at least one of the first light and the second light, and the first optical processing includes processing of introducing the dummy light being the first light, and the processing of introducing the dummy light includes processing of generating the dummy light, processing of splitting the dummy light and generating a plurality of parts of split dummy light, and processing of simultaneously introducing the plurality of parts of split dummy light to each of the plurality of first fibers.

* * * * *